United States Patent [19]

Rouse

[11] Patent Number: 5,260,933
[45] Date of Patent: Nov. 9, 1993

[54] ACKNOWLEDGEMENT PROTOCOL FOR SERIAL DATA NETWORK WITH OUT-OF-ORDER DELIVERY

[75] Inventor: Gerald L. Rouse, Round Rock, Tex.

[73] Assignee: International Business Machines Corporation, Armonk, N.Y.

[21] Appl. No.: 883,639

[22] Filed: May 15, 1992

[51] Int. Cl.$^5$ .............................................. H04L 1/16
[52] U.S. Cl. .................................... 370/14; 370/110.1
[58] Field of Search ...................... 370/13, 14, 17, 60, 370/68.1, 94.1, 105.1, 110.1; 371/32, 33; 340/825.06, 825.16; 178/4.1 C, 69 L, 69 H

[56] References Cited

U.S. PATENT DOCUMENTS

| | | | |
|---|---|---|---|
| 4,970,714 | 11/1990 | Chen et al. | 370/17 |
| 5,042,029 | 8/1991 | Hayakawa | 370/13 |
| 5,119,370 | 6/1992 | Terry | 370/110.1 |
| 5,151,899 | 9/1992 | Thomas et al. | 370/94.1 |
| 5,189,669 | 2/1993 | Nunokawa | 370/60 |

FOREIGN PATENT DOCUMENTS

WO92/10894 6/1992 PCT Int'l Appl. .

OTHER PUBLICATIONS

American National Standard for Information Systems, Fibre Channel, Physical and Signaling Interface (FC-PH), Rev. 2.2, Jan. 24, 1992, pp. 110-111 (def of ACK_1 and ACK_N), p. 155 (Infinite Buffers & ACK_N), pp. 181-182 (ACK-1 Rules and ACK_N Rules), p. 204 (29.2.4.3), pp. 277-279 (Annex N.) and pp. 308-309 (Annex T).

Primary Examiner—Benedict V. Safourek
Attorney, Agent, or Firm—Casimer K. Salys

[57] ABSTRACT

A system and method for controlling the transmission of frames or packets of data in a serial network which allows out-of-order delivery. The data frames transmitted by the initiator node to the recipient node include frame serial number or sequence count information. Acknowledgment frames, transmitted by the recipient node to indicate delivery of the data frame or packet, include matching serial number or sequence count information. According to one form of the present invention, the initiator node and recipient node include resources which relate the serial number or sequence count information, resources which include control information in the acknowledgment frame, and resources which determine the transmit status of all acknowledgment frames prior to that specified by serial number or sequence count in the acknowledgment frame. The status information is used at the initiator node to update the status of any data frames whose acknowledgment has not been received as a consequence of an out-of-order delivery to the recipient, a delay in processing by the recipient, a delay of the acknowledgment frame in the transmission back to the initiator node, or a complete loss of the acknowledgment frame.

10 Claims, 2 Drawing Sheets

FRAME HEADER FORMAT

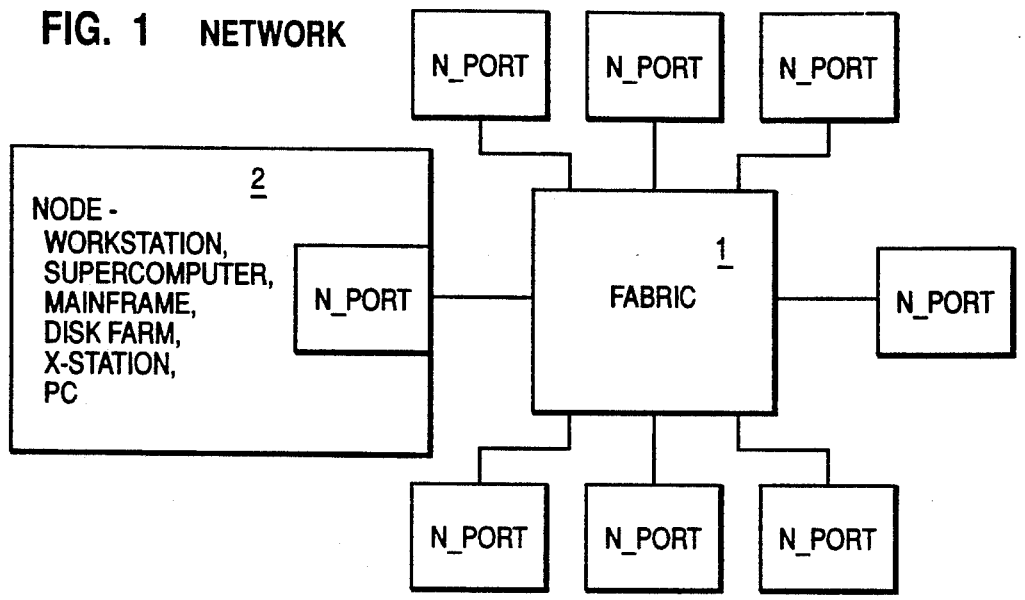
FIG. 1 NETWORK
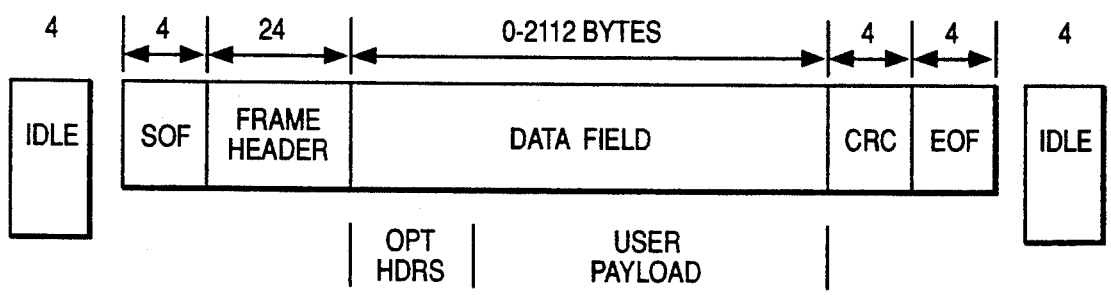
FIG. 3 FC-2 FRAME FORMAT
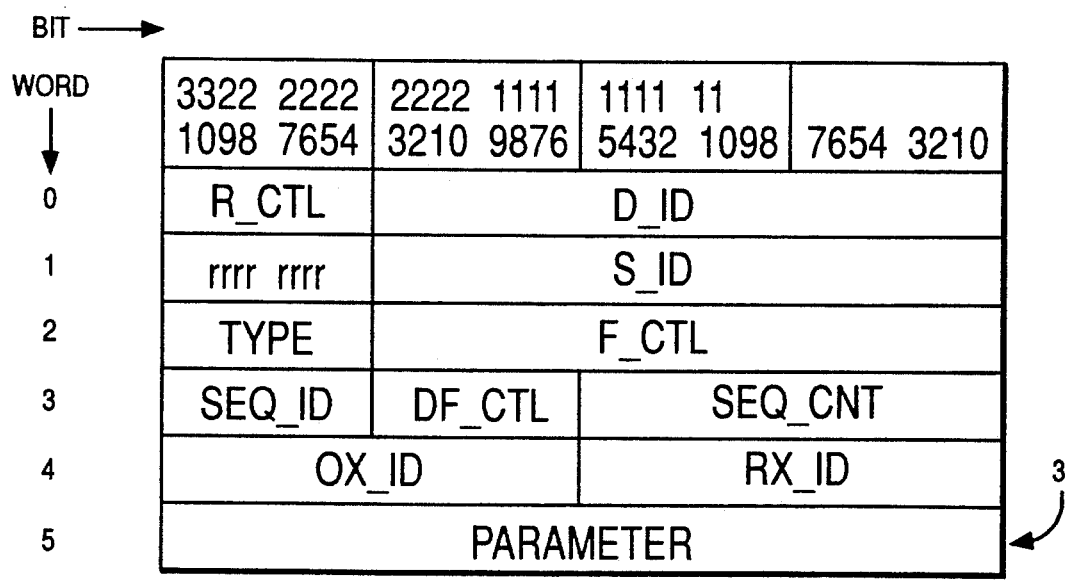
FIG. 4 FRAME HEADER FORMAT

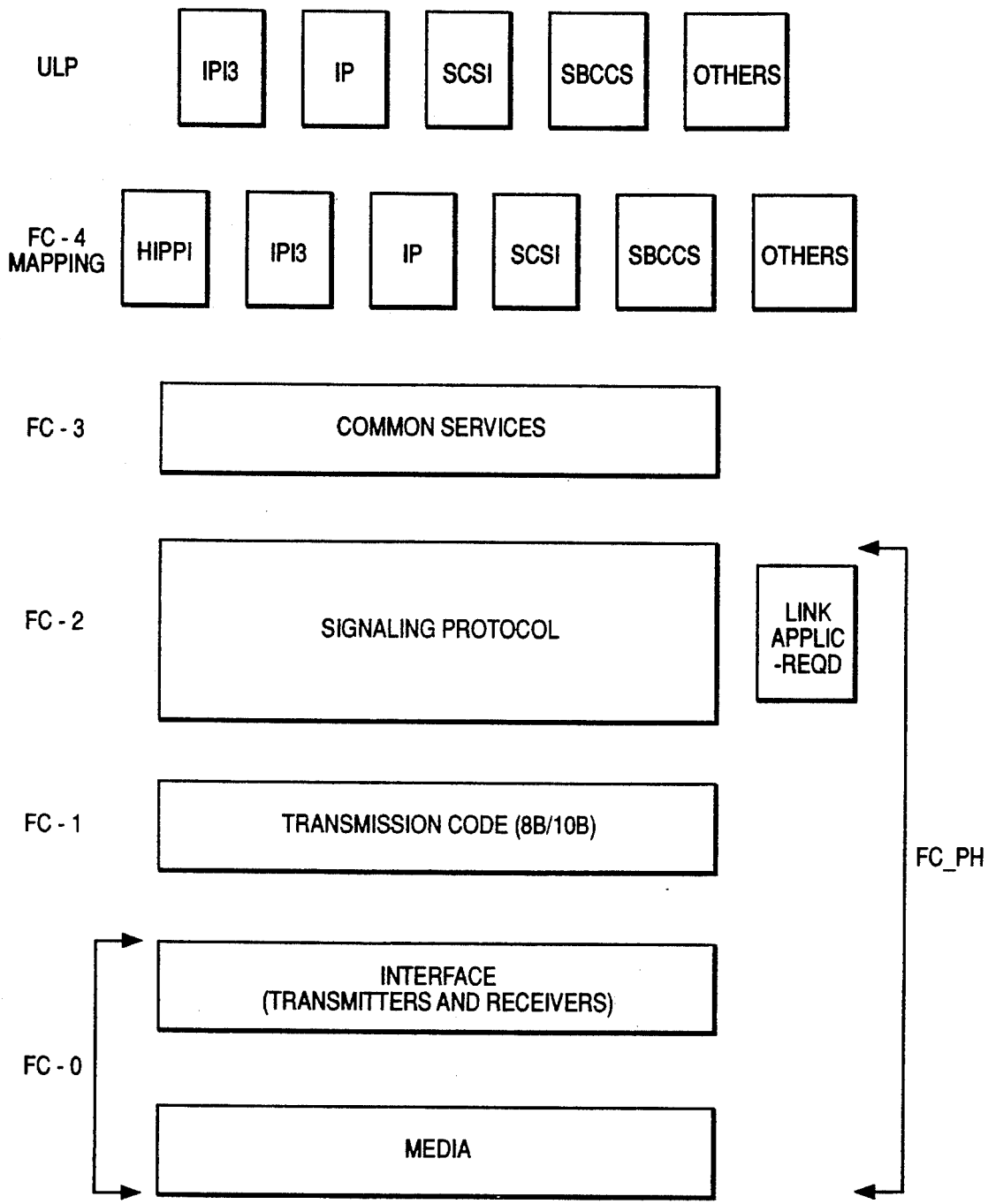
FIG. 2  FIBRE CHANNEL STANDARD HIERARCHY

ACKNOWLEDGEMENT PROTOCOL FOR SERIAL DATA NETWORK WITH OUT-OF-ORDER DELIVERY

BACKGROUND OF THE INVENTION

The present invention relates generally to systems and methods for transmitting frames or packets of information through a communication network. More particularly, the invention is directed to systems and methods for transmitting frames or packets of information in serial networks which utilize acknowledgments and allow out-of-order delivery of the frames or packets.

Numerous serial data communication protocols exist for transmitting frames or packets of information from an initiator (source) node to a recipient (destination) node in local and wide area networks. To ensure the consistency of the data at the receiving end, conventional practice involves the use of an acknowledgment transmission from the recipient node back to the initiator node upon acceptance of the information in the frame by the recipient. Though acknowledgment signals are not used as a routine in voice communication environments, comprehensive acknowledgment usage is mandatory for integrity in digital data transmissions.

A commercially available example of a serial network is the fibre optical serial channel used with the RISC System/6000 workstation product sold by IBM Corporation. Another example of such a system is defined by the Fibre Channel Standard (FCS) being developed by the American National Standards Institute (ANSI) X3T9.3 Task Group. The technology is documented in the Fibre Channel Physical and Signaling Interface (FC_PH) Rev. 2.2 document available from Global Engineering, 2805 McGaw Street, Irvine, Calif. 92714.

A fundamental weakness of the technologies in present use and proposed in such standards arises from the need of an acknowledgment frame for each data frame transmitted by the initiator. Without specific network protocol constraints, out-of-order delivery of data frames is the serial packet network norm of operation. Even if delivery of data frames or packets follows the order transmitted, there remains the possibility that the processing of the frames by the recipient to confirm adequacy of the information in the frames may differ between successive frames. The timing of the acknowledgment transmissions would follow accordingly. Similarly, the acknowledgment frame is also subject to the out-of-order delivery to the initiator as a consequence of a busy network. In some circumstances the acknowledgment frame is completely lost as a consequence of an error in the network. Also possible are volitional deletions of acknowledgments by the network as a consequence of congestion or priority conditions. On the other hand, the rate of network communication is reduced significantly if the protocol requires that the data frames wait for an acknowledgment of each preceding data transmission, or that channels of the network be monopolized to ensure consistency of the data transmission and acknowledgment information.

In addition to acknowledgments that are lost, and as a consequence initiate error procedures within the network, standards of the type noted earlier define networks in which one or more acknowledgment frames have the misfortune of being transmitted and retransmitted into a then busy network. In each case the acknowledgment frames are returned to recipient node for later retransmission while the initiator node waits for the acknowledgment specific to the data frame.

Given the difficulty of handling out-of-order or lost acknowledgments, the prevailing design practice has been to require an ordered transmission in which an acknowledgment is expected for each data frame transmitted. Though the standards contemplate the use of time windows for delayed acknowledgment, the approach has proven to be relatively slow and particularly susceptible to further degradation as network congestion increases.

SUMMARY OF THE INVENTION

The present invention provides systems and methods of practice which facilitate out-of-order transmission of data by the initiator, and acknowledgment information by the recipient, in frames or packets over a multi-node serial network. The architecture and protocol are implemented by system and method resources at the initiator and recipient ends of the communication path. The resources relate data frame serial number or sequence count as defined at the initiator node to corresponding serial number or sequence count in the acknowledgment information transmitted from the recipient node. The invention is characterized by its provision for controller parameter information in the acknowledgment frame, such information representing that all acknowledgments for data frames prior to the serial number or sequence count of the acknowledgment were transmitted by the recipient node. In a preferred implementation, the acknowledgment frame includes within the frame header parameter field a control bit to indicate by its state the transmission status of all preceding acknowledgment frames.

These and other features of the invention will be more clearly understood and appreciated upon considering the detailed description which follows.

BRIEF DESCRIPTION OF THE DRAWINGS

FIG. 1 is a schematic block diagram of a network.

FIG. 2 is a schematic block diagram of a fibre channel standard communication hierarchy.

FIG. 3 is a schematic block diagram of a FC-2 frame format.

FIG. 4 is a schematic block diagram of a frame header format.

DESCRIPTION OF THE PREFERRED EMBODIMENT

The present invention finds particular usage and value in systems and methods conforming to the Fibre Channel Standard (FCS) defined by the ANSI X3T9.3 Task Group. The FCS defines a serial communication architecture and protocol for a network composed of multiple nodes connected through a communication medium. Information in the form of a data frame or packet is transmitted from an initiator node to a recipient node. FCS also defines an acknowledgment protocol, in which the recipient transmits a frame or packet of information back to the initiator to indicate reception of the data frame or packet.

A high level depiction of the FCS network appears in FIG. 1. Fabric 1 is the medium of communication, and broadly encompasses both optical and electronic transmission and related data manipulation resources. The fabric has connected thereto a multitude of N_Ports 2, each comprised of initiator/recipient systems suitable to communicate over the network. Examples of node systems include workstations, super computers, disk arrays, and personal computers. Prior practices have confirmed that where switching fabric 1 allows out-of-order delivery, transmissions requiring acknowledgments are slow in the absence of a bandwidth allocation (channel monopoly) mode of operation. The poor performance for an out-of-order delivery protocol has been attributed to the fabric busy states or priority transmissions which delay mandated acknowledgment frames.

The present invention provides out-of-order delivery of both data and acknowledgment frames while retaining network performance. The initiator node provides with each data frame transmitted to the recipient a frame serial number or sequence count for the frame. Each acknowledgment frame transmitted by the recipient, to indicate delivery of the data frame, contains the matching serial number or sequence count of the corresponding data frame which it is acknowledging. However, the acknowledgment frame also incorporates a control bit within the frame header parameter field to indicate the status at the recipient as of that data frame. The status in the acknowledgment frame indicates whether or not all acknowledgments to data frames prior to that identified by the acknowledgment frame serial number or sequence count have been transmitted by the recipient. The additional control parameter can be a single bit, indicating by binary state the composite transmission history of earlier acknowledgment frames.

A preferred implementation of the acknowledgment protocol described above draws upon the FCS network depicted in FIG. 1. As defined by FCS, the channels of communication between nodes provide for any-to-any and peer-to-peer communication, as well as master-slave or initiator-target relationships. Each has resources to provide three classes of service through the fabric: Class 1—Dedication Connection, Class 2—Multiplex (Connectionless), and Class 3—Datagram (Connectionless).

Each FCS channel is defined as logically composed of multiple hierarchical levels, as schematically depicted in FIG. 2. The channel is not "layered" with fixed service intervals between levels, but rather, allows for a high level of chip integration of functions in successive layers. For instance, the signal protocols accomplished in layers FC-0, FC-1 and FC-2 can be implemented in a single integrated circuit chip.

FC-0 defines the physical link attributes, which include support for various data rates, single and multi-mode optical fibre, coaxial cable, and twisted pair wires. Transmitter/receiver pairs include long wave and short wave lasers, long wave LEDs, and electrical interfaces.

FC-1 uses the IBM 8B/10B transmission code to provide reliable communication. The 8B/10B code is DC-balanced and provides special 10-bit transmission characters which facilitate byte and word alignment through the use of ordered sets. An ordered set is a four byte word which contains a K28.5 in its first position followed by three data characters. Ordered sets are used to specify primitive signals, primitive sequences and frame delimiters (Start_of_Frame, End_of_Frame).

Primitive sequences are ordered sets of digital information used to initialize or reset the fibre link. Continuous transmission of a specific primitive sequence conveys network status information. Each primitive sequence is interlocked waiting for a primitive sequence transmitted in response. Following a link initialization protocol of primitive sequences, idles (a primitive signal) are transmitted on the link. Frame transmission is accomplished by inserting a frame in the idle stream. Each frame is encapsulated between a Start_of_Frame (SOF) delimiter and an End_of_Frame (EOF) delimiter, as shown in FIG. 3.

The Start_of_Frame delimiter delineates a frame boundary, defines a sequence boundary, and identifies the Class (1, 2, or 3) of the frame. The frame header immediately follows the SOF and contains sufficient information to control the transfer of information from a ULP in an initiator (source) N_Port to a ULP in a recipient (destination) N_Port. Following the frame header is the data field which may contain optional headers and payload. A 32-bit CRC checks the contents of the frame from the frame header to the end of the data field. The data field is required to be a word-multiple and may contain up to three fill bytes on the end of the data field.

The FC-2 level (FIG. 2) provides the format for performing I/O operations, known as exchanges. An exchange is composed of one or more sequences flowing in one direction at any given time. Each sequence is composed of a consecutive series of data frames. As shown in FIG. 3, the first data frame of a sequence is identified by a SOFix (initiate) to define the beginning of a sequence (where x specifies Class 1, 2, or 3). Other frames within the sequence are started with a SOFnx (normal).

The fields composing the frame header are shown in FIG. 4. R_CTL is used for routing control. D_ID (Destination Identifier) and S_ID (Source Identifier) are 24 bit fields used to identify a specific N_Port within the address domain of the fabric. The small address was chosen to allow fast N_Port selection within the fabric. The TYPE field specifies the upper level protocol being used. The F_CTL (Frame Control) field provides a number of control bits which aid the signaling protocol. SEQ_ID is a one-byte identifier to identify a specific sequence within an exchange. DF_CTL, (Data Field Control) identifies the presence of optional headers in the data field.

The SEQ_CNT field is a frame count within the sequence. Each sequence starts with a SEQ_CNT of 0 and is incremented by one for each frame transmitted. The OX_ID is a 2-byte exchange identifier uniquely assigned by the initiator of the exchange. The RX_ID is a 2-byte exchange identifier uniquely assigned by the recipient of the exchange. The parameter field is used to contain a relative offset of the payload for data frames.

In Class 1 and 2, each data frame is acknowledged by transmitting an ACK frame with a matching SEQ_CNT. Busy and reject frames are also defined to notify the transmitter that the frame could not be delivered. A Class 1 dedicated connection is requested by transmitting a frame containing an SOFcl delimiter. The S_ID N_Port waits for an ACK frame in response from the recipient N_Port. When the ACK is received, the connection is established and the first sequence initiated. Each N_Port may then initiate other sequences. The connection is removed by transmitting an EOFdt (disconnect-terminate) delimiter on the last ACK. A remove connection protocol is defined in order to coordinate removal of the connection.

In Class 2, each data frame is delivered as a single entity without the establishment of a dedicated connection. In Class 2, busy and reject response frames are also provided. The normal rules for originating and managing exchanges apply to both Class 1 and 2. In Class 3, each data frame is delivered on a best-effort basis without response frames.

In order to determine the operating characteristics of an N_Port, each N_Port performs a login sequence with the fabric and each N_Port with which it communicates. Parameters include classes supported, number of buffers available (credit), and worldwide name. Since the number of buffers is known, each N_Port may transmit frames up to its credit limit (M) prior to receiving an ACK frame. The ACK frame transmitted in response indicates that the buffer which received the frame is available for further frame reception. If an error is detected, the sequence is aborted and retransmitted in its entirety or from the point of failure, depending on the ULP.

In the preferred context of a fibre channel standard network operating in a Class 2 mode, the present invention provides system and method resources at the initiator and recipient nodes to create and use control information contained in a frame header parameter field of the acknowlegment frame, such control information indicating that all prior acknowledgment frames were transmitted by the recipient. The preferred implementation utilizes a control bit in parameter field 3 of the frame header defined by the format in FIG. 4. The delivery of an acknowledgment to the initiator node with the control bit set to 0 indicates that all acknowledgment frames prior to the serial number associated with that acknowledgment were in fact transmitted by the recipient node. On the other hand, the presence of a 1 in the control bit position indicates that at least one of the data frames with a serial number preceding that of the acknowledgment had, as of the transmission time of the acknowledgment in question, either not been received, or not been processed by the recipient, been found to have an error, or not been acknowledged. Thus, the combination of the data frame serial number and control bit in the acknowledgment frame extends the status information to include both a data frame delivery status and an acknowledgment transmission history.

The use of an acknowledgment frame with a control bit indicative of prior data frame receipt and acknowledgment transmission status provides numerous network benefits. First, it permits out-of-order delivery and processing of data frames at the recipient node, since the status of the order as perceived by the initiator is reset each time the control bit conveys a historical update. Out-of-order delivery is similarly permissible for the acknowledgment frames. This is particularly important in that a network conforming to the architecture and protocol defined in the fibre channel standard is susceptible to conflicting transmissions which have priority. Such events can delay or defer for later retransmission the affected acknowledgment frames. Furthermore, even the complete loss of an acknowledgment frame is no longer of consequence when utilizing the system and method defined by the present invention.

In the preferred implementation, a workstation such as the RISC System/6000 with an AIX operating system, both available from IBM Corporation, executes application code at the initiator and recipient nodes to accomplish the methods defined by the invention.

The initiator is the transmitter of data frames and the receiver of acknowledgment frames. The recipient is the receiver of the data frames and transmitter of the acknowledgment frames. Both the initiator and recipient track the progress of the sequence (collection of data frames flowing in one direction) in a Sequence Status Block. In this embodiment, Fabric Busy (F_BSY) frames are processed. In addition, Max_Credit is used as the upper bound on the number of unacknowledged data frames that may be transmitted before receiving an acknowledgment. Credit_Cnt is a variable in the transmitter used to count data frames which have not been acknowledged. Credit_Cnt is incremented on data frame transmission and decremented on reception of an acknowledgment. Both F_BSY and Credit_Cnt are optional features. When Parm=0 in the ACK frame, all acknowledgment frames up to that FR_CNT have been transmitted. When Parm=1 in the ACK frame, one or more previous data frames has not been acknowledged.

Pseudocode, from which source code can be derived, sets forth the preferred process to be accomplished at the initiator node. In general, the pseudocode prescribes the tracking of data frame transmissions and the receipt of related acknowledgment frames. The pseudocode begins with an initialization sequence, defines a data frame transmission tracking sequence, defines an acknowledgment receipt processing sequence, and concludes with a sequence responsive to the acknowledgment information. The variables used in the pseudocode are defined individually as follows:

FR_CNT—the serial number transmitted in the Data frame by the Initiator (i.e. part of the frame header).

I_FR_CNT—the highest Data frame serial number transmitted by the Initiator which is retained in the Sequence Status Block.

ACK_FR_CNT—the highest serial number of any ACK frame received which is retained in the Sequence Status Block.

ACK_R_R—ACK Receive Register (in this example, 8 bits) indexed 0 to 7 where index value 7 (a bit) corresponds to ACK_FR_CNT. Index value 6 corresponds to ACK_FR_CNT-1 and index value 0 corresponds to ACK_FR_CNT-7.

CREDIT_CNT—a value representing the number of buffers available in the Recipient for receiving Data frames.

MAX_CREDIT—a value representing the maximum number of buffers available at the Recipient for receiving Data frames.

MISS_ACK_CNT—a count of ACK frames received which are out of the ACK window of processing. Credit is reclaimed after the Sequence is completed.

```
INITIALIZE:
    I_FR_CNT = 0;
    ACK_FR_CNT = 0;
    ACK_R_R = B'11111111';
    MISS_ACK_CNT = 0; /* RECLAIM AT END OF SEQUENCE */
END INITIALIZE;
DATA_FRAME_TRANSMIT:
    IF (CREDIT_CNT < MAX_CREDIT) AND (DATA TO TRANSMIT)
    THEN
```

-continued

```
            BEGIN TRANSMIT;
            BUILD FRAME HEADER;
            APPEND PAYLOAD INFORMATION;
            I_FR_CNT = I_FR_CNT+1;
            FR_CNT = I_FR_CNT;
            TRANSMIT FRAME;
            CREDIT_CNT = CREDIT_CNT + 1;
            END TRANSMIT;
        ELSE
            WAIT FOR CREDIT;
            WAIT FOR DATA TO TRANSMIT;
END DATA_FRAME_TRANSMIT;

F_BSY RECEIVED TO DATA FRAME:

RETRANSMIT DATA FRAME;
    END F_BSY TO DATA FRAME;

ACK _RECEPTION:
    IF (FR_CNT = ACK_FR_CNT)
        THEN DETECT DUPLICATE FRAME ERROR;
    IF (FR_CNT < ACK_FR_CNT)
        THEN BEGIN:
            IF (ACK_R_R = B'11111111')
                THEN DISCARD ACK;
                ELSE BEGIN:
                    BITNUM = ACK_FR_CNT - FR_CNT;
                    SETBIT = 7 - BITNUM;
                    SET ACK_R_R (BITNUM) = 1;
                    CREDIT_CNT = CREDIT_CNT - 1;
                    IF (PARM = 0)
                    THEN DO I = BITNUM TO 0 BY -1;
                        IF ACK_R_R (I) = 0;
                            THEN BEGIN;
                                CREDIT_CNT = CREDIT_CNT - 1;
                                ACK_R_R (I) = 1;
                                END BEGIN;
                        END DO;
                    ELSE;
                END BEGIN;
        END BEGIN;
    ELSE:
IF (FR_CNT > ACK_FR_CNT)
        THEN BEGIN;
            GOBIT = 1;
            DO WHILE (GOBIT=1);
            IF (ACK_R_R (0) = 0)
                THEN SET MISS_ACK_CNT = MISS_ACK_CNT + 1;
                ELSE;
                BEGIN;
                    /* SHIFT ACK_R_R LEFT ONE BIT */
                    ACK_R_R (0) = ACK_R_R (1);
                    ACK_R_R (1) = ACK_R_R (2);
                    ACK_R_R (2) = ACK_R_R (3);
                    ACK_R_R (3) = ACK_R_R (4);
                    ACK_R_R (4) = ACK_R_R (5);
                    ACK_R_R (5) = ACK_R_R (6);
                    ACK_R_R (6) = ACK_R_R (7);
                    IF (PARM = 0)
                        THEN BEGIN;
                            ACK_R_R (7) = 1;
                            CREDIT_CNT = CREDIT_CNT - 1;
                            END BEGIN;
                        ELSE ACK_R_R (7) = 0; /* PARM = 1 */
                    ACK_FR_CNT = ACK_FR_CNT + 1;
                    IF (FR_CNT = ACK_FR_CNT) AND (ACK_R_R (7) = 1)
                        THEN BEGIN;
                            GOBIT = 0;
                            EXIT;
                            END BEGIN;
                        ELSE;
                    IF (FR_CNT = ACK_FR_CNT) AND (ACK _R_R (7) = 0)
                        THEN BEGIN:
                            CREDIT_CNT = CREDIT_CNT - 1;
                            ACK_R_R (7) = 1;
                            GOBIT = 0;
                            EXIT;
                            END BEGIN;
                        ELSE;
```

```
        END BEGIN;
            END DO_WHILE;
    END BEGIN;
    ELSE;
END ACK_RECEPTION;
```

The system and process activities at the recipient node generally track the data frame reception and the acknowledgment frame transmission operations. The pseudocode begins with an initialization sequence, defines operations related to the reception of a data frame, defines processes associated with creating a frame header for the acknowledgment frame, undertakes the transmission of the acknowledgment frame, and defines a response to a busy state of the network fibre. The variables used in the pseudocode set forth below for the recipient node are defined as follows:

FR_CNT—the serial number received in the Data frame by the Recipient (i.e. part of the frame header) and transmitted in the ACK frame acknowledging the Data frame specified by FR_CNT.

DF_FR_CNT—the highest Data frame serial number received by the Recipient which is retained in the Sequence Status Block.

DF_R_R—Data frame _Receive_Register (in this example, 8 bits) indexed 0 to 7 where index value 7 (a bit) corresponds to DF_FR_CNT. Index value 6 corresponds to DF_FR_CNT-1 and index value 0 corresponds to DF_FR_CNT-7. This register is used to detect missing Data frames.

ACK_FR_CNT—the highest serial number of any ACK frame transmitted which is retained in the Sequence Status Block.

ACK_T_R—ACK_Transmit_Register (in this example, 8 bits) indexed 0 to 7 where index value 7 (a bit) corresponds to ACK_FR_CNT. Index value 6 corresponds to ACK_FR_CNT-1 and index value 0 corresponds to ACK_FR_CNT-7.

CREDIT_CNT—a value representing the number of buffers available in the Recipient for receiving Data frames.

BITNUM—a register used in calculations to set bits in a register.

SETBIT—a register used in calculations to set bits in a register.

GOBIT—a single bit variable used to control a DO_WHILE loop.

```
INITIALIZE:
    DF_R_R = B'11111111';
    ACK_FR_CNT = 0;
    ACK_T_R = B'11111111';
END INITIALIZE;

DATA_FRAME_RECEPTION:
    IF (BUFFER AVAILABLE)
        THEN
            BEGIN STORE_BUFFER;
            IF (FIRST FRAME OF SEQUENCE)
                THEN BEGIN;
                    DR_FR_CNT = FR_CNT;
                    EXIT;
                    END BEGIN;
                ELSE;
            IF (FR_CNT < DF_FR_CNT)
                THEN BEGIN;
                    BITNUM = DF_FR_CNT - FR_CNT;
                    SETBIT = 7 - BITNUM;
                    SET DF_R_R (BITNUM) = 1;
                    END BEGIN;
                ELSE BEGIN; /* DF_FR_CNT < FR_CNT */
                    GOBIT = 1;
                    DO WHILE (GOBIT=1);
                        IF (DF_R_R(0)=0)
                            THEN SET MISSING_FRAME_ERROR;
                            ELSE BEGIN;
                            /* SHIFT DF_R_R LEFT ONE BIT */
                            DF_R_R (0) = DF_R_R (1);
                            DF_R_R (1) = DF_R_R (2);
                            DF_R_R (2) = DF_R_R (3);
                            DF_R_R (3) = DF_R_R (4);
                            DF_R_R (4) = DF_R_R (5);
                            DF_R_R (5) = DF_R_R (6);
                            DF_R_R (6) = DF_R_R (7);
                            DF_R_R (7) = 0;
                            DF_FR_CNT = DF_FR_CNT + 1;
                            IF (FR_CNT = DF_FR_CNT)
                                THEN BEGIN;
                                    SET DF_R_R (7) = 1;
                                    GOBIT = 0;
                                    EXIT;
                                    END BEGIN;
                                ELSE GOBIT = 1;
                            END BEGIN;
```

```
                END DO_WHILE;
                PASS TO BUFFER MANAGEMENT;
                BUFFER MANAGEMENT INDICATES BUFFER EMPTIED
            END STORE_BUFFER;
        ELSE
            TRANSMIT P_BSY;
    END DATA_FRAME_RECEPTION;

ACK_TRANSMISSION (BUFFER EMPTIED);
    USE DATA FRAME HEADER TO CONSTRUCT ACK FRAME;
    IF (FR_CNT > ACK_FR_CNT)
        THEN BEGIN;
            GOBIT = 1;
            DO WHILE (GOBIT=1);
                IF (ACK_T_R(0)=0
                    THEN SET PARM = 1;
                    ELSE BEGIN;
                        /* SHIFT ACK_T_R LEFT ONE BIT */
                        ACK_T_R (0) = ACK_T_R (1);
                        ACK_T_R (1) = ACK_T_R (2);
                        ACK_T_R (2) = ACK_T_R (3);
                        ACK_T_R (3) = ACK_T_R (4);
                        ACK_T_R (4) = ACK_T_R (5);
                        ACK_T_R (5) = ACK_T_R (6);
                        ACK_T_R (6) = ACK_T_R (7);
                        ACK_T_R (7) = 0;
                        ACK_FR_CNT = ACK_FR_CNT + 1;
                        IF (FR_CNT = ACK_FR_CNT)
                            THEN BEGIN;
                                SET ACK_T_R (7) = 1;
                                GOBIT = 0;
                                EXIT;
                                END BEGIN;
                            ELSE GOBIT = 1;
                        END BEGIN;
            END DO_WHILE;
            DO I = 7 TO 0 BY -1;
                IF (ACK_T_R (I) = 0)
                    THEN BEGIN;
                        PARM = 1;
                        EXIT;
                        END BEGIN;
                    ELSE PARM = 0;
            END DO;
            TRANSMIT ACK FRAME;
            END BEGIN;
        ELSE;
IF (FR_CNT < ACK_FR_CNT)
    THEN BEGIN;
        BITNUM - ACK_FR_CNT - FR_CNT;
        SETBIT = 7 - BITNUM;
        SET ACK_T_R (BITNUM) = 1;
        DO I = BITNUM TO 0 BY -1;
            IF ACK_T_R (I) = 0;
                THEN BEGIN;
                    PARM = 1;
                    EXIT;
                    END BEGIN;
                ELSE PARM = 0;
        END DO;
        TRANSMIT ACK FRAME;
        EXIT;
        END BEGIN;
END ACK_TRANSMISSION;

F_BSY_TO_ACK:

BITNUM = 0;
DO I = 7 TO 0 BY -1; /* COUNT ACKS NOT TRANSMITTED */
    IF (ACK_T_R (I) = 0)
        THEN BITNUM = BITNUM + 1;
        ELSE;
END DO;
IF (BITNUM = MAX_CREDIT) /* INITIATOR OUT OF CREDIT */
    THEN RETRANSMIT ACK    /* THEN RETRANSMIT ACK    */
    ELSE DISCARD F_BSY TO ACK;
END F_BSY_TO_ACK;
```

Although the invention has been described and illustrated by way of a specific embodiment, the methods, systems and programs encompassed by the invention should be interpreted consistent with the breadth of the claims set forth hereinafter.

I claim:

1. A system for transmitting data in frames, comprising:
   initiator means for transmitting data frames incorporating frame sequence information to a recipient in a network:
   recipient means for receiving the data frames from the network and determining the transmission status of previous acknowledgment frames; and
   means for transmitting an acknowledgment frame which includes the status of previous acknowledgment frames to the initiator.

2. The system recited in claim 1, further comprising:
   means for receiving the acknowledgment frame from the network and updating the status of data frames at the initiator means.

3. The system recited in claim 2, wherein the frame sequence information is a serial number or frame count attributed to the frame of data.

4. The system recited in claim 3, wherein the status of previous acknowledgment frames indicates whether all preceding acknowledgment frames have been transmitted.

5. The system recited in claim 4, wherein the means for receiving the acknowledgment cancels any error or retransmit conditions for data frames previously acknowledged.

6. A system for transmitting information in frames over a serial data network susceptible to frame loss, delay or rearranged order upon delivery, comprising:
   initiator means for transmitting data frames having serial number or sequence count to a recipient in the network;
   recipient means for receiving the data frames from the network and determining the transmission status of previous acknowledgment frames; and
   means for transmitting an acknowledgment frame which includes the transmission status of previous acknowledgment frames to the initiator means.

7. The system recited in claim 6, further comprising:
   means for receiving the acknowledgment frame from the network and updating the status of data frames at the initiator means.

8. A method for transmitting serial data in frames, comprising the steps of:
   transmitting data frames incorporating frame sequence information to a recipient in a network;
   receiving the data frames from the network and determining the transmission status of previous acknowledgment frames; and
   transmitting an acknowledgment frame which includes the transmission status of previous acknowledgment frames to an initiator.

9. The method recited in claim 8, further comprising the step of:
   receiving the acknowledgment frame from the network and updating the status of data frames at the initiator.

10. The method recited in claim 9, wherein the frame sequence information is a serial number or frame count attributed to the frame of data.

* * * * *